United States Patent
Rejeti et al.

(10) Patent No.: US 11,401,882 B2
(45) Date of Patent: Aug. 2, 2022

(54) METHOD FOR DETECTING HEATER CORE ISOLATION VALVE STATUS

(71) Applicant: Ford Global Technologies, LLC, Dearborn, MI (US)

(72) Inventors: Sitaram Rejeti, Farmington, MI (US); Robert Roy Jentz, Westland, MI (US); Sridhar Kalivarapu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 355 days.

(21) Appl. No.: 16/536,138

(22) Filed: Aug. 8, 2019

(65) Prior Publication Data

US 2021/0040911 A1 Feb. 11, 2021

(51) Int. Cl.
| | | |
|---|---|---|
| *G06G 7/70* | (2006.01) | |
| *F02D 41/22* | (2006.01) | |
| *F01P 7/16* | (2006.01) | |
| *F01P 11/16* | (2006.01) | |

(52) U.S. Cl.
CPC .............. *F02D 41/221* (2013.01); *F01P 7/16* (2013.01); *F01P 11/16* (2013.01); *F01P 2023/00* (2013.01); *F01P 2025/30* (2013.01); *F01P 2025/32* (2013.01); *F02D 2200/021* (2013.01)

(58) Field of Classification Search
CPC .... F02D 41/221; F02D 2200/021; F01P 7/16; F01P 11/16; F01P 2023/00; F01P 2025/30; F01P 2025/32
USPC ......................................................... 701/102
See application file for complete search history.

(56) References Cited

U.S. PATENT DOCUMENTS

| | | | | |
|---|---|---|---|---|
| 6,463,892 B1* | 10/2002 | Russell | ................... | F01P 11/14 |
| | | | | 123/198 D |
| 7,363,804 B2* | 4/2008 | Wakahara | ................ | F01P 11/14 |
| | | | | 374/E15.001 |
| 8,573,163 B2* | 11/2013 | Kinomura | ................ | F01P 11/16 |
| | | | | 123/41.08 |
| 8,683,854 B2* | 4/2014 | Pursifull | .................. | F01P 11/16 |
| | | | | 73/114.68 |
| 8,689,617 B2* | 4/2014 | Rollinger | .................. | F01P 7/10 |
| | | | | 73/114.68 |
| 9,341,105 B2* | 5/2016 | Jentz | ......................... | F01P 3/20 |
| 9,631,547 B2* | 4/2017 | Porras | ..................... | F01P 7/165 |
| 2009/0283604 A1* | 11/2009 | Martinchick | ...... | B60H 1/00392 |
| | | | | 237/12.3 B |

(Continued)

OTHER PUBLICATIONS

Kalivarapu, S. et al., "Method for Detecting Heater Core Isolation Valve Status," U.S. Appl. No. 16/432,849, filed Jun. 5, 2019, 44 pages.

*Primary Examiner* — Hung Q Nguyen
*Assistant Examiner* — Anthony Donald Taylor, Jr.
(74) *Attorney, Agent, or Firm* — Vincent Mastrogiacomo; McCoy Russell LLP

(57) ABSTRACT

Methods and systems are provided for monitoring a status of a heater core isolation valve (HCIV) housing in an engine coolant circuit including a first coolant loop and a second coolant loop. In one example, a method may include indicating degradation of the HCIV based on a difference between a first coolant loop temperature and a second coolant loop temperature upon activation of coolant system pumps and deactivation of a positive temperature coefficient (PTC) heater housed in the cabin heating loop.

19 Claims, 8 Drawing Sheets

(56) References Cited

U.S. PATENT DOCUMENTS

| | | | |
|---|---|---|---|
| 2013/0255605 A1* | 10/2013 | Jentz | F01P 11/16 |
| | | | 123/41.15 |
| 2014/0110081 A1* | 4/2014 | Porras | F01P 11/04 |
| | | | 165/11.1 |
| 2014/0114515 A1* | 4/2014 | Porras | B60W 20/20 |
| | | | 701/22 |
| 2014/0114516 A1* | 4/2014 | Badger | B60H 1/2218 |
| | | | 701/22 |
| 2018/0321000 A1* | 11/2018 | Ogaki | H05K 7/20927 |

* cited by examiner

METHOD FOR DETECTING HEATER CORE ISOLATION VALVE STATUS

FIELD

The present description relates generally to methods and systems for a heater core isolation valve and a temperature sensor coupled to a coolant circuit of a vehicle propulsion system.

BACKGROUND/SUMMARY

A plug-in hybrid electric vehicle (PHEV) may include more than one method for providing passenger cabin heating to accommodate an operating mode of the PHEV. For example, the PHEV may have a primary coolant circuit that flows coolant through both an engine cooling loop and a cabin heating loop when the PHEV is energized by fuel combustion, utilizing waste heat from an engine system of the PHEV to warm the passenger cabin. The secondary coolant circuit may include circulating coolant through the cabin heating loop and not the engine cooling loop and a path of coolant flow may be controlled by a heater core isolation valve (HCIV). A positive temperature coefficient (PTC) heater may be housed in the cabin heating loop to supply heat to the heater core when engine heat is unavailable. The HCIV may be adjustable between coupling the engine cooling loop and the cabin heating loop and isolating the engine cooling loop from the cabin heating loop.

In some examples, an exhaust gas recirculation (EGR) cooler may be included in the engine cooling loop. The EGR cooler may receive a portion of a flow of coolant that has circulated through the engine block, and utilize heat extraction provided by the coolant to reduce a temperature of EGR gases before the gases are delivered to the engine block for combustion. When the engine cooling loop is coupled to the cabin heating loop, coolant may flow from the EGR cooler to the cabin heating loop where heat absorbed by the coolant is exchanged at a heater core and used to warm the passenger cabin.

In some instances, the HCIV may become stuck in a position that isolates the engine cooling loop from the cabin heating loop. As a result, heated coolant from the EGR cooler may not be cooled by heat exchange in the cabin heating loop. An ability of the EGR cooler to cool EGR gases may degrade, leading to termination of EGR flow. Stopping EGR flow may cause an undesirable increase in levels of carbon monoxide, nitrogen oxides, particulate matter, and non-methane hydrocarbons in the exhaust gases released to the atmosphere from the vehicle's exhaust system. Thus, detecting when the HCIV is degraded and stuck in one position may circumvent halting of EGR flow. However, monitoring of a status of the HCIV is obfuscated by a lack of a position feedback mechanism.

One example attempt to detect a position of a HCIV is shown by Porras in U.S. Pub. No. 2014/0110081. Therein, during an engine-off condition, upon actuation of the HCIV to a position coupling a primary cooling circuit of an engine to a secondary cooling circuit, a degradation in a HCIV of a PHEV is detected by monitoring responses of temperature sensors to a position of the HCIV and a status of a vehicle heating system. A valve system of a vehicle selectively directs coolant from an engine to a heat exchanger and is configured to detect a position of the HCIV based on a comparison of coolant temperature entering the heat exchanger to coolant temperature exiting the engine.

However, the inventors herein have recognized potential issues with such systems. As one example, the diagnostic method shown by Porras may not be carried out during engine off conditions. During long drives when the engine is operated, HCIV degradation may not be detected causing undesired decrease in EGR flow. Furthermore, upon detection of degradation of the HCIV valve, the diagnosis may not mitigate heating of coolant by an EGR cooler and delivery of the heated coolant to a degas bottle. Thermal degradation of EGR system components may occur, leading to costly repairs.

In one example, the issues described above may be addressed by a method for indicating degradation of a coolant system valve coupling a first coolant loop and a second coolant loop based on a first difference between a first coolant loop temperature and a second coolant loop temperature responsive to selective operation of coolant system pumps and a positive temperature coefficient (PTC) heater. In this way, by actively adjusting coolant system pumps, PCT heater, and separating the cabin heating loop from the cooling loop, a HCIV valve degradation may be diagnosed and appropriate mitigating actions may be undertaken.

As one example, a rationality of a coolant temperature sensor coupled to the cabin heating loop of the coolant circuit may be confirmed by monitoring a difference between an output of the coolant temperature sensor (ECT2) and at least one of a temperature (ECT) of the engine cooling loop as inferred via inputs from an engine cylinder head temperature sensor and an ambient temperature (AAT) after a long period of vehicle inactivity (soak). Further, rationality of the coolant temperature sensor may be confirmed by continually monitoring a difference between ECT2 and ECT during changes in engine operating conditions. Upon confirmation of the coolant temperature sensor being not degraded, the HCIV valve may be diagnosed passively and actively upon respective conditions being met. During a passive HCIV diagnostic method, degradation of the HCIV valve may be indicated based on a higher than threshold deviation of the coolant temperature at the cabin heating loop from the coolant temperature at the engine cooling loop. During an active HCIV diagnostic method, the HCIV valve is actuated to an open position such that the coolant circulates through each of the engine cooling loop and the cabin heating loop. A main pump coupled to the engine cooling loop and an auxiliary pump coupled to the cabin heating loop may be activated and the PCT heater may be deactivated. Degradation of the HCIV valve may be indicated based on a higher than threshold difference between the coolant temperature at the cabin heating loop and the coolant temperature at the engine cooling loop. In response to detection of HCIV valve degradation, EGR flow may be adjusted during subsequent engine operation and the PCT heater may be used to provide cabin heating.

In this way, by continually monitoring the HCIV status in a passive approach and intrusively monitoring the HCIV status at least once during a drive cycle, HCIV degradation may be effectively detected. Also, by continually monitoring status of a coolant system temperature sensor, overall coolant system health may be improved. The technical effect of detecting HCIV degradation during engine operation is that EGR flow may be adjusted accordingly without adversely affecting emissions quality. By identifying HCIV valve degradation, cabin heating may not be interrupted and the PCT heater may be opportunistically activated to provide the desired heating. Overall, by monitoring status of coolant system components, EGR delivery may be improved, thereby improving fuel efficiency and emissions quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
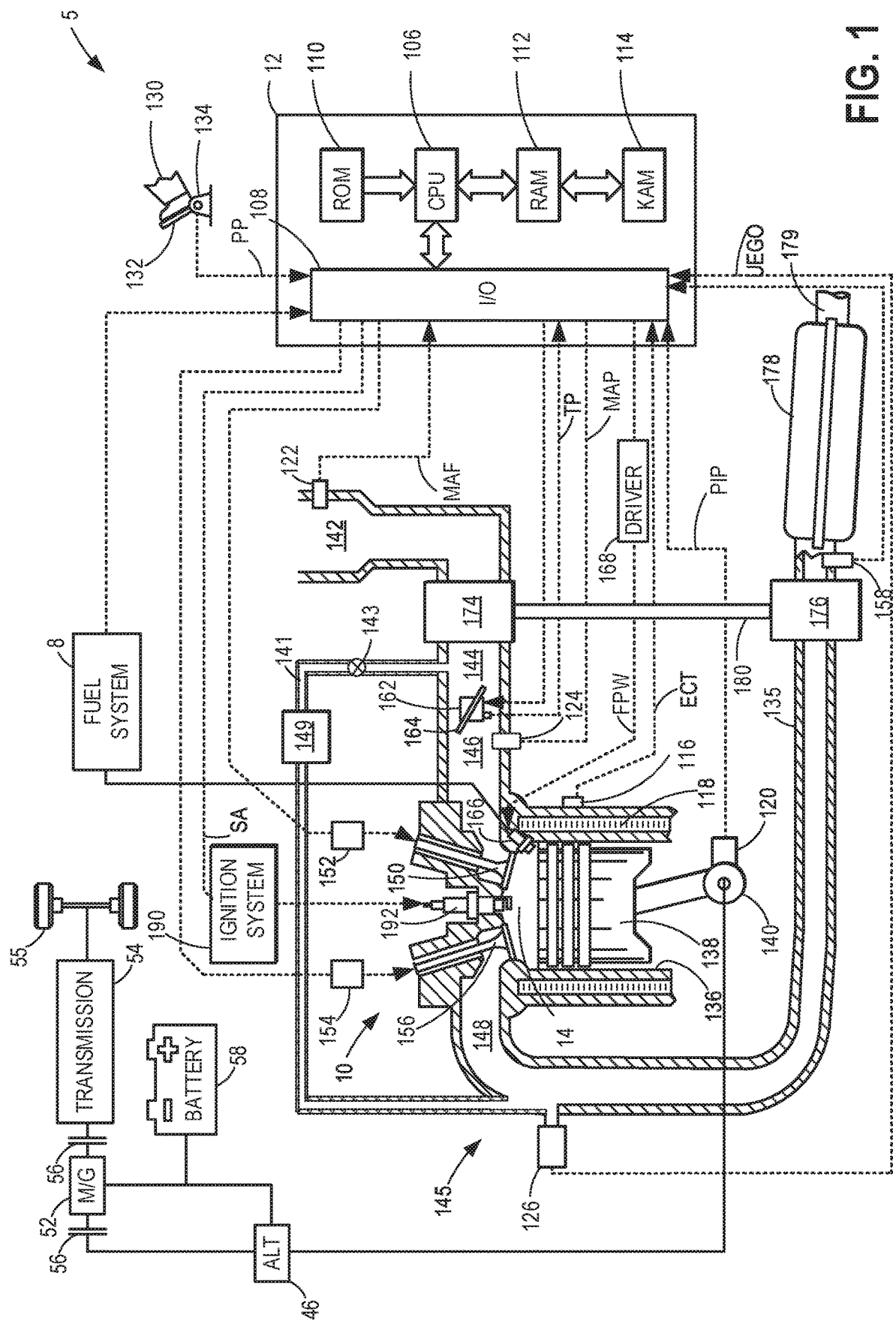
FIG. 1 shows an example of an engine system configured to be cooled by a cooling system.
Figure 7:
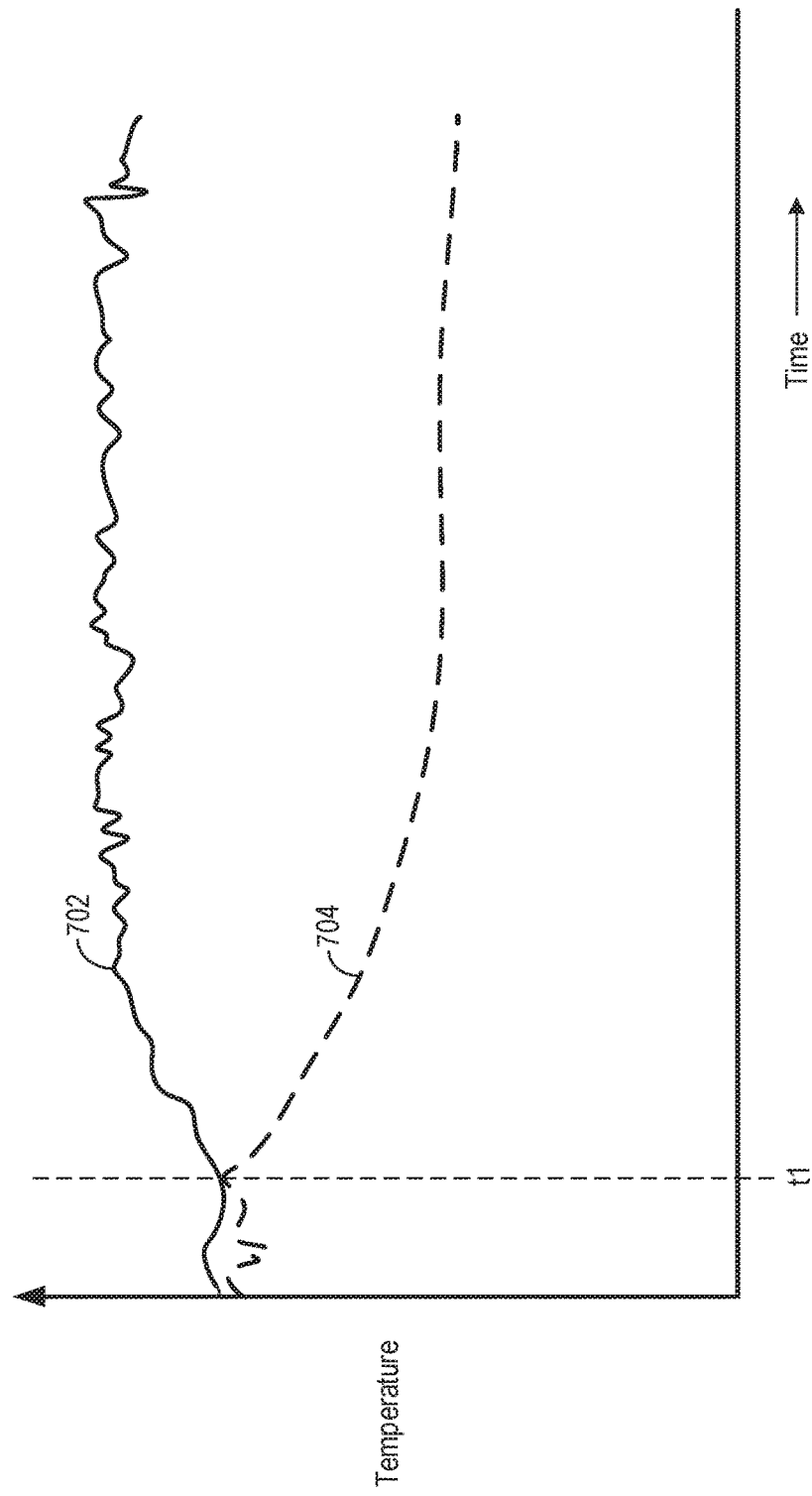
FIG. 7 shows an example plot of engine cooling loop temperature and cabin heating loop temperature upon degradation of the HCIV.
Figure 8:
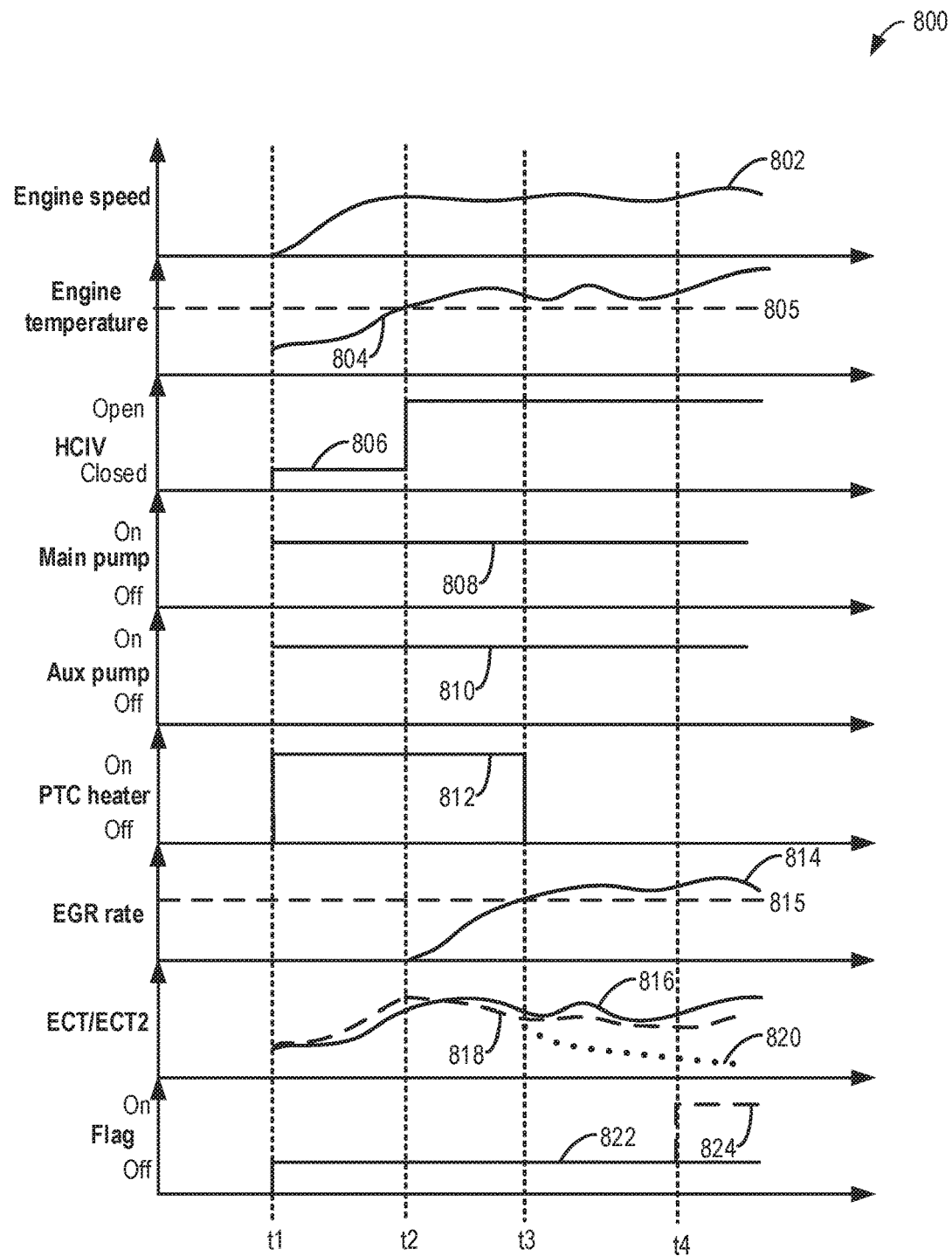
FIG. 8 shows an example diagnostic of the HCIV.

The following description relates to systems and methods for determining a status of a coolant system temperature sensor and a heater core isolation valve (HCIV). The HCIV may be included in a plug-in hybrid electric vehicle (PHEV), relying on both a traction battery and an internal combustion engine to propel the vehicle. An example of an engine system that may be implemented in the PHEV is shown in FIG. 1. The engine system may be cooled by a portion of a coolant system that forms an engine cooling loop, configured to circulate a coolant through various components of the engine system. The primary circuit may include both the engine cooling loop and a cabin heating loop, the loops fluidly coupled to one another. As the coolant flows through the primary circuit when the PHEV engine is operating, heat is extracted from the engine block, a temperature of EGR gases is reduced, and heat is removed from the coolant as the coolant flows through the cabin heating loop. The coolant system may also have a secondary circuit that flows the coolant solely through the cabin heating loop when the PHEV is operating in an electric mode. The engine cooling loop and the cabin heating loop may be linked by an HCIV, as shown in a schematic diagram of the coolant system in FIG. 2. An example of an HCIV is shown in FIGS. 3A-3B, alternating between a first position and a second position, the positions controlling flow of coolant through either the primary circuit or the secondary circuit. An engine controller may be configured to perform control routines, such as the example routine of FIG. 4 to determine status of the coolant system temperature sensor and example routines of FIGS. 5-6 to determine status of the HCIV. A difference in coolant temperature in the engine cooling loop and the cabin heating loop when the HCIV is degraded is shown in FIG. 7. An example timeline for carrying out diagnostics of the HCIV is shown in FIG. 8.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

Cylinder 14 may be cooled by a cooling sleeve 118 that circumferentially surrounds cylinder 14 and flows a coolant there through. The cooling sleeve 118 may be included in a coolant system that circulates coolant through various components of the engine 10 to provide cooling and heat exchange and may regulate engine temperature and utilization of waste heat. A temperature sensor 116 coupled to the cooling sleeve 118 or a cylinder head. A temperature of coolant exiting the engine cylinders may be estimated based on input from the temperature sensor 116. An engine coolant circuit may include an engine cooling loop and a cabin heating loop coupled via a heater core isolation valve (HCIV). The engine cooling loop includes an engine, the main pump, a degas bottle, a radiator, and an EGR cooler, and the cabin heating loop includes the positive temperature coefficient (PTC) heater, a heater core, the auxiliary pump, and the temperature sensor. In the open position of the HCIV, the coolant exiting the engine bifurcates with a first portion of coolant flowing through each of an EGR cooler, a three-way junction in the cabin heating loop, the auxiliary pump, the PTC heater, a heater core, the HCIV, an engine oil cooler, and the main pump prior to returning to the engine, and a second portion of coolant flowing through each of a radiator, a degas bottle, and the main pump prior to returning to the engine. In the closed position of the HCIV, the coolant circulates through the auxiliary pump, the PTC heater, the heater core, the HCIV, and the three-way junction without returning to the engine.

When the engine 10 is not operating, heat is not generated and as a result passenger cabin heating may not be obtained through waste heat from the engine 10 or from the EGR cooler 149. As an alternative, the PHEV may have a coolant system that includes a primary circuit where an engine cooling loop and a cabin heating loop are fluidly coupled through an HCIV, providing cabin heating by using waste heat from the engine, and a secondary circuit, where the engine cooling loop and the cabin heating loop are isolated from one another and cabin heating is enabled by an electric heater.

Figure 2:
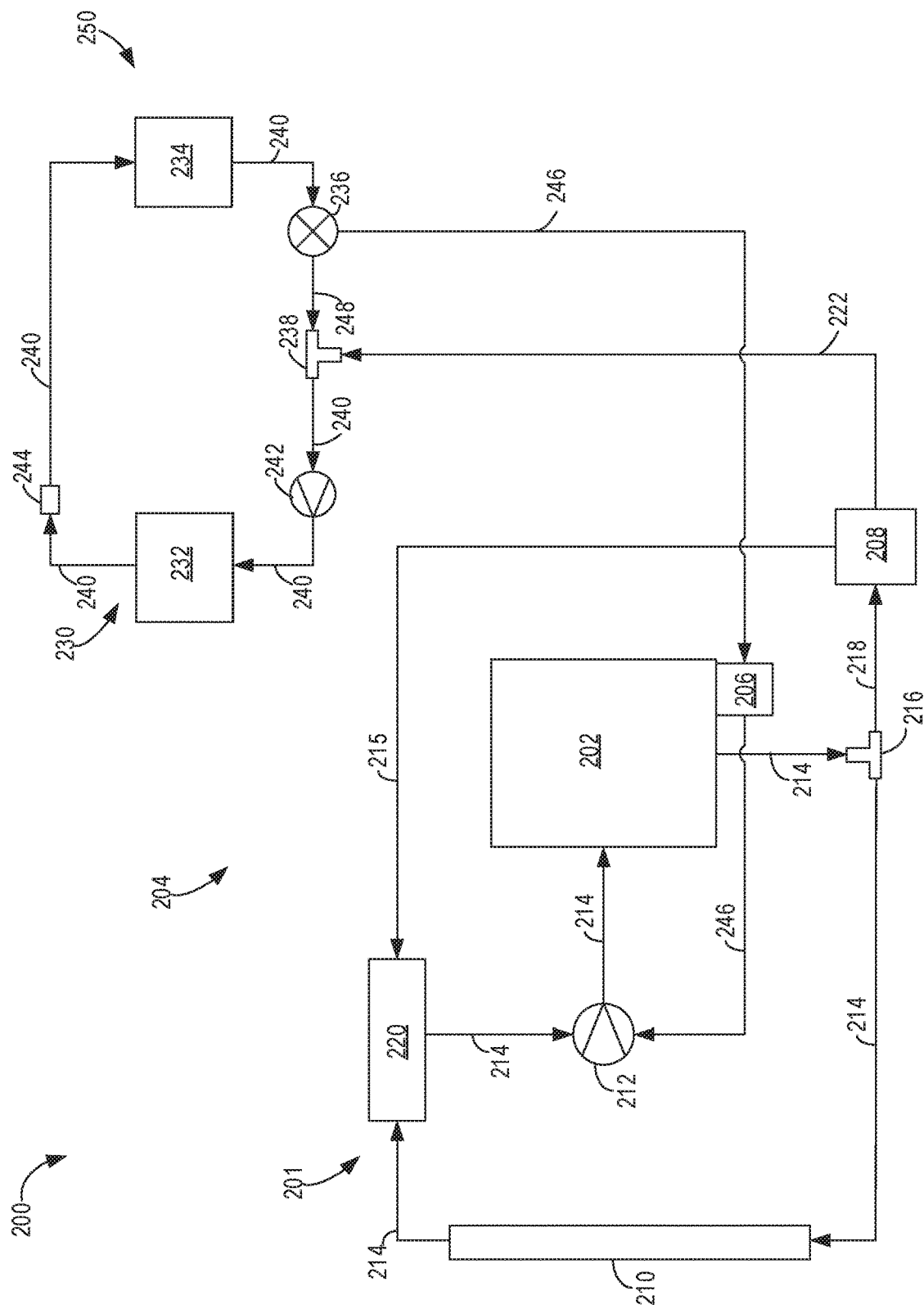
FIG. 2 shows an example of a cooling system of a PHEV including a primary cooling circuit and a secondary cooling circuit.
Figure 3:
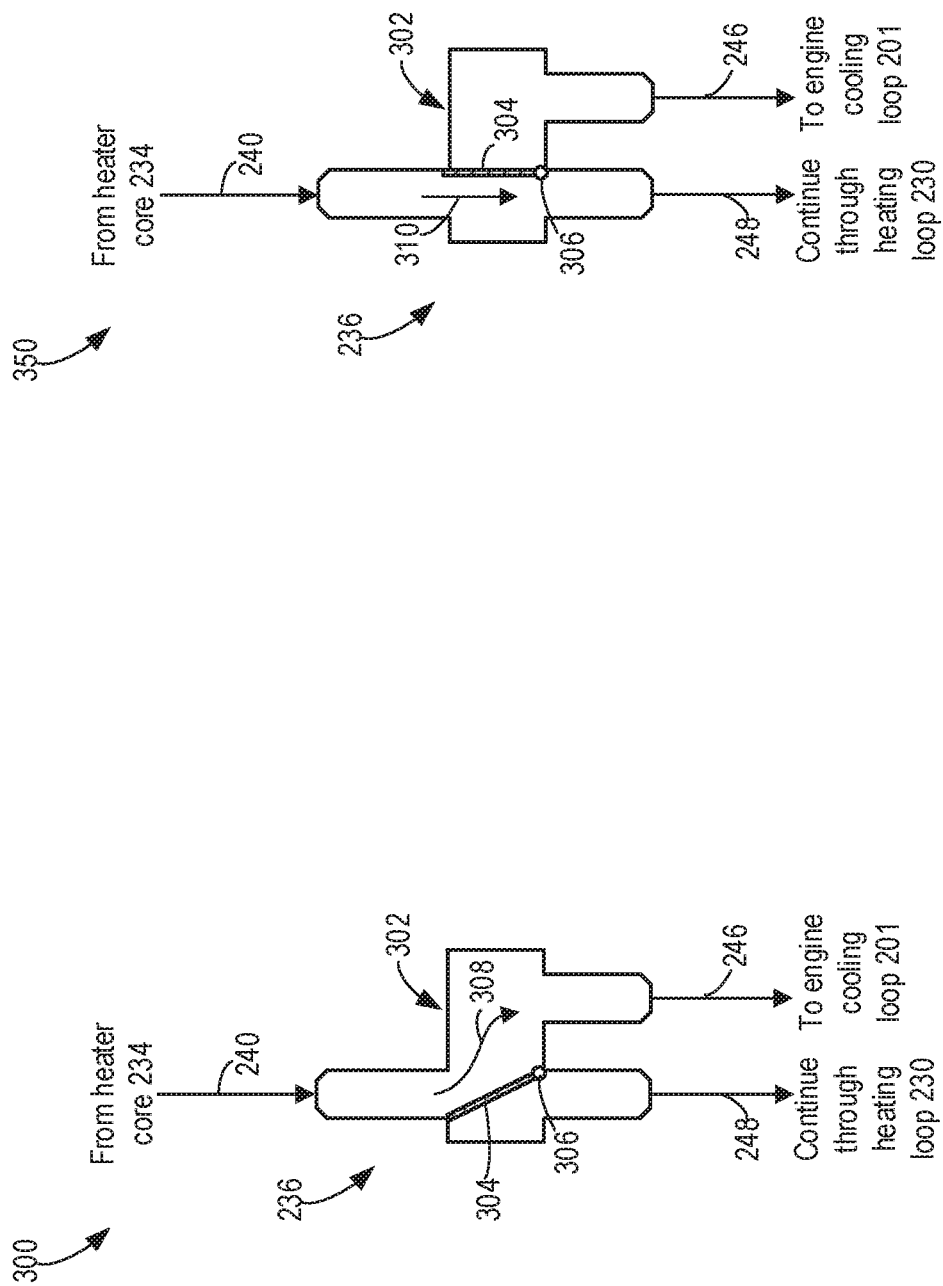
FIG. 3A shows an example of a heater core isolation valve (HCIV), which may be included in the cooling system of FIG. 2, arranged in a first position.
FIG. 3B shows the example of the HCIV arranged in a second position.

An example of a coolant system which may be coupled to the engine 10 is shown in FIG. 2 and described further below.

In some examples, vehicle 5 may be a hybrid vehicle, such as a plug-in hybrid electric vehicle (PHEV), with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust system 145 is coupled to cylinder 14 via a poppet valve 156. The exhaust system includes an exhaust manifold 148, an emission control device 178, and exhaust tail pipe 179. Exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO. Emission control device 178 may be a three-way catalyst, a NOx trap, various other emission control devices, or combinations thereof.

Engine 10 may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust manifold 148 to intake passage 144 via EGR passage 141. The amount of EGR provided to intake passage 144 may be varied by controller 12 via EGR valve 143. In other examples, engine 10 may be configured to also provide low pressure EGR (not shown in FIG. 1) being provided via an LP-EGR passage coupled between the engine intake upstream of the turbocharger compressor 174 and the engine exhaust downstream of the turbine 176.

Furthermore, when the engine 10 is operating and generating exhaust gas, heat from the EGR gases may be extracted through an EGR cooler 149, arranged in the EGR passage 141 in a path of gas flow. The EGR cooler 149 may be a heat exchanger, utilizing cooling by air-to-liquid heat exchange, as an example. Coolant may flow through the EGR cooler 149, absorbing heat from the hot gases and flowing to a heater core where the heat is extracted from the coolant via liquid-to-air heat exchange and directed to a passenger cabin to heat the cabin. Heat transfer between the EGR gases and an engine coolant system is described further below with reference to FIG. 2. It will be appreciated that while the EGR cooler 149 is shown in FIG. 1 upstream of the EGR valve 143, other examples may include the EGR cooler 149 arranged downstream of the EGR valve 143 or in another region of the EGR passage 141.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and further configured to inject this fuel mixture directly into cylinder. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to the cooling sleeve 118 or a cylinder head; an ambient temperature (AAT) from a temperature sensor coupled to the vehicle body; an exhaust gas temperature from a temperature sensor 158 coupled to exhaust passage 135; a profile ignition pickup signal (PIP) from a Hall effect sensor 120 (or other type) coupled to crankshaft 140; throttle position (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1 and employs the various actuators of FIG. 1 (such as HCIV) to adjust engine operation based on the received signals and instructions stored on a memory of the controller. For example, the controller may obtain the ECT from the temperature sensor 116 and adjust a flow of coolant circulating through the cooling sleeve 118 based on the ECT.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

When the engine 10 of FIG. 1 is implemented in a PHEV, the PHEV may operate as a hybrid electric vehicle with an ability to connect to an external electric grid. The PHEV may be driven over a range propelled by the electric machine 52, powered by the battery 58, and switch to the engine 10 when the battery 58 is depleted below a threshold power level.

In FIG. 2, a schematic diagram of a coolant system 200 of a PHEV is depicted. The coolant system may be coupled to an engine 202, such as the engine 10 of FIG. 1, and may provide cooling to combustion chambers of the engine 202 by flowing a coolant through a water jacket or cooling sleeve, such as the cooling sleeve 118 of FIG. 1. The coolant may be glycol, an aqueous glycol solution, or some other type of coolant with a lower freezing point than water. The coolant system 200 has two distinct circuits: a primary circuit 204 that flows coolant through both an engine cooling loop 201 and a cabin heating loop 230 and a secondary circuit 250 formed exclusively of the cabin heating loop 230. The engine cooling loop 201 includes components such as the engine 202, an engine oil cooler 206, an EGR cooler 208, and a radiator 210 and the cabin heating loop 230 includes a PTC heater 232, a heater core 234, and a HCIV 236. The primary circuit 204 may be configured to both cool the engine 202 and provide heating to a passenger cabin of the PHEV when heating is requested and the engine 202 is operating. The secondary circuit 250 may provide heating to the passenger cabin when the engine is not running and the PHEV is operating in an electric mode.

The engine cooling loop 201 includes a main pump 212 that drives coolant flow through the primary circuit 204 via coolant line 214. The main pump 212 may be mechanically or electrically driven. For example, the coolant may flow from the pump 212 to the engine 202. After circulating through the engine 202 and extracting heat from the engine 202, the flow may be directed to a first three-way junction 216 that splits the flow of heated coolant. A first portion of coolant flow may be directed to the radiator 210, via coolant line 214, and a second portion directed to the EGR cooler 208, via coolant line 218. While operating in the primary coolant circuit with coolant flowing through both the engine cooling loop and the cabin heating loop, the flow through the EGR cooler may be higher (such as 5 liters per minute) compared to a lower, negligible coolant flow (such as 0.01 liters per minute) through the EGR cooler when the coolant is solely circulated through the cabin heating loop.

The first portion of the coolant flow may flow through the radiator 210 where heat from the coolant may be transferred to the radiator 210. All or part of the heat recovered by the radiator 210 may be dissipated to the atmosphere. In some examples, the heat absorbed by the radiator may be channeled to the passenger cabin to assist in warming the cabin. The first portion of the coolant flow may flow from the radiator 210 to a degas bottle 220 where the coolant may be de-aerated before returning to the main pump 212.

The second portion of the coolant flow may flow from the first three-way junction 216 to the EGR cooler 208 and extract heat from EGR gases flowing there through. When the PHEV is operating with the engine 202 running and flowing coolant through the primary coolant circuit 204, the second portion of the coolant flow may continue from the EGR cooler 208 to the cabin heating loop 230, via coolant line 222. The coolant enters the cabin heating loop 230 at a second three-way junction 238 and flows via coolant line 240.

An auxiliary pump 242 may be positioned downstream of the second three-way junction 238, driving coolant flow through the cabin heating loop 230. The auxiliary pump 242 may be electrically or mechanically driven. Coolant is pumped to the PTC heater 232, which, as described above, may be an electric, self-regulating heater. When the PHEV engine 202 is operating and coolant is flowing through the primary circuit 204, passenger cabin heating may be provided by heat extracted from the EGR gases at the EGR cooler 208. The coolant is already heated upon arrival at the PTC heater 232 and the PTC heater 232 is not activated. However, during engine cold starts, when the engine 202 is operating and coolant is flowing through the primary circuit 204, the engine 202 may not be sufficiently warm to provide passenger cabin heating. The PTC heater 232 may be turned on to heat the coolant in the cabin heating loop 230 until the engine 202 reaches a threshold operating temperature, enabling the PTC heater 232 to be deactivated.

The coolant flows from the PTC heater 232 to the heater core 234. A coolant temperature sensor 244 may be arranged in the path of coolant flow between the PTC heater 232 and the heater core 234 to monitor a temperature of the coolant prior to interaction with the heater core 234. A temperature of coolant exiting the engine may be estimated based on output of a temperature sensor coupled to a cylinder cooling sleeve or a cylinder head. A dedicated engine cooling loop temperature sensor may be coupled to the coolant line 214 downstream of engine 202 to estimate coolant temperature in the engine cooling loop. Rationality of the coolant temperature sensor 244 may be carried out to determine the robustness of the coolant system. After a longer than threshold period of engine inactivity, a first difference between a first coolant loop temperature and a second coolant loop temperature may be compared to a threshold difference, a second difference between the second coolant loop temperature and ambient temperature may be compared to the threshold difference, and degradation of the coolant temperature sensor 244 in response to one or both of the first difference and the second difference being higher than the threshold difference. The first coolant loop temperature may a temperature of coolant flowing through the engine cooling loop (also referred herein as first coolant loop) as estimated based on inputs from a cylinder head temperature sensor and/or a cylinder cooling sleeve temperature sensor, and the second coolant loop temperature is a temperature of coolant flowing through the cabin heating loop (also referred herein as second coolant loop), as estimated based on inputs of the coolant temperature sensor 244 housed in the cabin heating loop. Throughout the drive cycle, a status of the coolant temperature sensor 244 may be monitored by comparing the output of the coolant temperature sensor to an anticipated coolant temperature, and degradation of the coolant temperature sensor 244 may be detected in response to the output of the coolant temperature sensor being out of range of the anticipated temperature, the anticipated temperature modelled based on one or more of engine speed, engine load, first or second position of the HCIV 236, and the temperate in first coolant loop temperature.

The heater core 234 may be a heat exchange device that extracts heat from the coolant, transfers the heat to air, and directs the absorbed heat to the passenger cabin. For example, a blower may be arranged adjacent to the heater core 234, utilizing liquid-to-air heat exchange across the heater core 234 to funnel heated air into the passenger cabin. A temperature of the coolant emerging from the heater core 234 is therefore reduced relative to the coolant entering the heater core 234.

The cooled coolant flows from the heater core 234 to the HCIV 236. The HCIV 236 may be a valve that may be varied between at least two positions. For example, a non-limiting example of the HCIV 236 of FIG. 2 is shown in FIGS. 3A-3B arranged in a first position 300 in FIG. 3A and a second position 350 in FIG. 3B. The HCIV 236 may be implemented in the coolant system 200 of FIG. 2 and configured to alternate between directing coolant flow through the primary circuit 204 and the secondary circuit 250 of FIG. 2.

The HCIV 236 has a pivotable partition 304 that rotates about a hinge 306. Adjustment of the partition 304 between the first position 300 and the second position 350 may be actuated by an electric, electromagnetic, or hydraulic device, or some other type of actuating mechanism.

In the first position 300 shown in FIG. 3A, the partition 304 is oriented in an "open" position so that flow from the heater core 234 of FIG. 2 passes through the HCIV 236, as indicated by arrow 308, along a continuous path that fluidly couples the cabin heating loop 230 to the engine cooling loop 201 of FIG. 2, thereby flowing coolant through the primary circuit 204. A solenoid in the HCIV may be de-energized to actuate the valve to the first, open position. The position of the partition 304 interrupts flow around the cabin heating loop 230 so that coolant is forced to divert along the direction indicated by arrow in the coolant line 246 to circulate through the engine cooling loop 201 of FIG. 2 before returning to the cabin heating loop 230. In the second position 350 shown in FIG. 3B, the partition 304 is pivoted in a clockwise, "closed" position, blocking flow from the heater core 234 to the engine cooling loop 201. The solenoid in the HCIV may be energized to actuate the valve to the second, closed position. Instead, coolant flows through the HCIV 236 as indicated by arrow 310 to continue circulating through the cabin heating loop 230, e.g., through the secondary circuit 250.

Returning to FIG. 2, when the HCIV 236 is adjusted to a first position, e.g., the first position 300 of FIG. 3A, coolant may flow from the heater core 234, through the HCIV 236 and to the engine oil cooler 206 via coolant line 246 while blocking flow between the HCIV 236 and the second three-way junction 238 via line 248. Coolant flow may be driven by operation of the main pump 212 and the auxiliary pump 242 may be deactivated unless a speed of the main pump 212 drops below a threshold speed, e.g., the main pump 212 becomes degraded. Thus the coolant is forced to flow from the cabin heating loop 230 to the engine cooling loop 201 via coolant line 246 and from the engine cooling loop 201 to the cabin heating loop 230 via coolant line 222. The first position allows the engine cooling loop 201 and the cabin heating loop 230 to be combined and fluidly coupled. Alternatively, when adjusted to a second position, e.g., the second position 350 of FIG. 3B, coolant flow between the heater core 234 and the engine oil cooler 206 is inhibited and coolant instead flows through the HCIV 236 to the second three-way junction 238, via coolant line 248, confining coolant circulation within the cabin heating loop 230, via coolant line 240. In this position, the cabin heating loop 230 is isolated from the engine cooling loop 201 and coolant is circulated through the secondary circuit 250 while the PHEV is operating in the electric mode and the engine 202 is not running.

During electric mode operation of the PHEV, cooling of the engine 202 and of EGR gases at the EGR cooler 208 may not be demanded or may be at least reduced. Flow between the EGR cooler 208 and the cabin heating loop 230 may therefore be discontinued without resulting in an increase in coolant temperature that may lead to thermal degradation of components of the engine cooling loop 201. The second portion of coolant, flowing from the engine 202 through the first three-way junction 216 and to the EGR cooler 208, may flow to the degas bottle 220, via coolant line 215, instead of to the cabin heating loop 230, via coolant line 222, when the HCIV 236 is in the second position.

As elaborated above, the HCIV 236 may be adjusted to the second position during electric mode operation, isolating the cabin heating loop 230 from the engine cooling loop 201. Flow through the cabin heating loop 230 is driven by operation of the auxiliary pump 242. The PTC heater 232 may be activated to heat the coolant as the coolant passes through. The heated transferred to the coolant from the PTC heater 232 is extracted from the coolant at the heater core 234, providing heat for warming the passenger cabin. In this way, the cabin heating loop 230 may heat the passenger cabin without relying on waste heat from the engine cooling loop 201.

If the HCIV 236 is degraded and becomes stuck in the second position, blocking coolant flow between the engine cooling loop 201 and the cabin heating loop 230 during engine operation when engine cooling is desired, the engine cooling loop 201 and the cabin heating loop 230 may remain isolated from one another. Further, without detection of a status of the HCIV 236, heated coolant may be forced to flow from the EGR cooler 208 to the degas bottle 220, via coolant line 215, which may alter a pressure of the degas bottle 220 and adversely affect an ability of the degas bottle 220 to maintain an air-free volume of coolant within the coolant system 200.

Furthermore, if the HCIV 236 is stuck in the second position, isolating the engine cooling loop 201 from the cabin heating loop 230, coolant circulating through the EGR cooler 208 may increase in temperature, reducing a capacity to cool EGR gases. Detection of insufficient cooling of EGR gases, by, for example a rise in intake manifold temperature, may lead to termination of EGR flow which may adversely affect emissions of the PHEV. Additionally, lack of heat extraction from the coolant via the cabin heating loop 230 may result in local boiling within the engine cooling loop 201 that may impose thermal stress on the EGR cooler 208. A status of the HCIV 236, e.g., whether the HCIV 236 is in the first or second position when coolant flow through the primary circuit 204, e.g., when the cabin heating loop 230 and the engine cooling loop 201 are combined, is requested, may be passively and actively assessed. During an active monitoring of the HCIV 236, each of the main pump 212 and the auxiliary pump 242 may be activated, and the PTC heater 232 may be deactivated. Degradation of the HCIV 236 may be indicated in response to a first difference between the first coolant loop temperature and the second coolant loop temperature being higher than a first threshold during the active monitoring of the HCIV 236. After completion of the active monitoring of the coolant system valve, throughout the drive cycle, the first difference between the first coolant loop temperature and the second coolant loop temperature may be compared to a second threshold, and degradation of the HCIV 236 may be indicated in response to the first difference being higher than the second threshold, the second threshold different from the first threshold.

In this way, the systems of FIGS. 1-3B enable a system for an engine comprising: a controller with computer readable instruction stored on non-transitory memory that, when executed, cause the controller to: activate a main pump coupled to an engine cooling loop of a coolant system, activate an auxiliary pump coupled to a cabin heating loop of the cooling system, deactivate a positive temperature coefficient (PTC) heater coupled to the cabin heating loop, actuate a heater core isolation valve (HCIV) coupling the engine cooling loop and the cabin heating loop to an open position to allow coolant to flow between the engine cooling loop and the cabin heating loop, estimate a cabin heating loop coolant temperature as a function of an output of a cylinder head temperature sensor and/or an output of a cylinder cooling sleeve temperature sensor, estimate an engine cooling loop coolant temperature based on an output of an engine cooling loop temperature sensor coupled to the engine cooling loop, estimate a difference between the cabin heating loop temperature and the engine cooling loop temperature, and indicate the HCIV stuck in a closed position in response to the difference being higher than a threshold difference.

Figure 4:
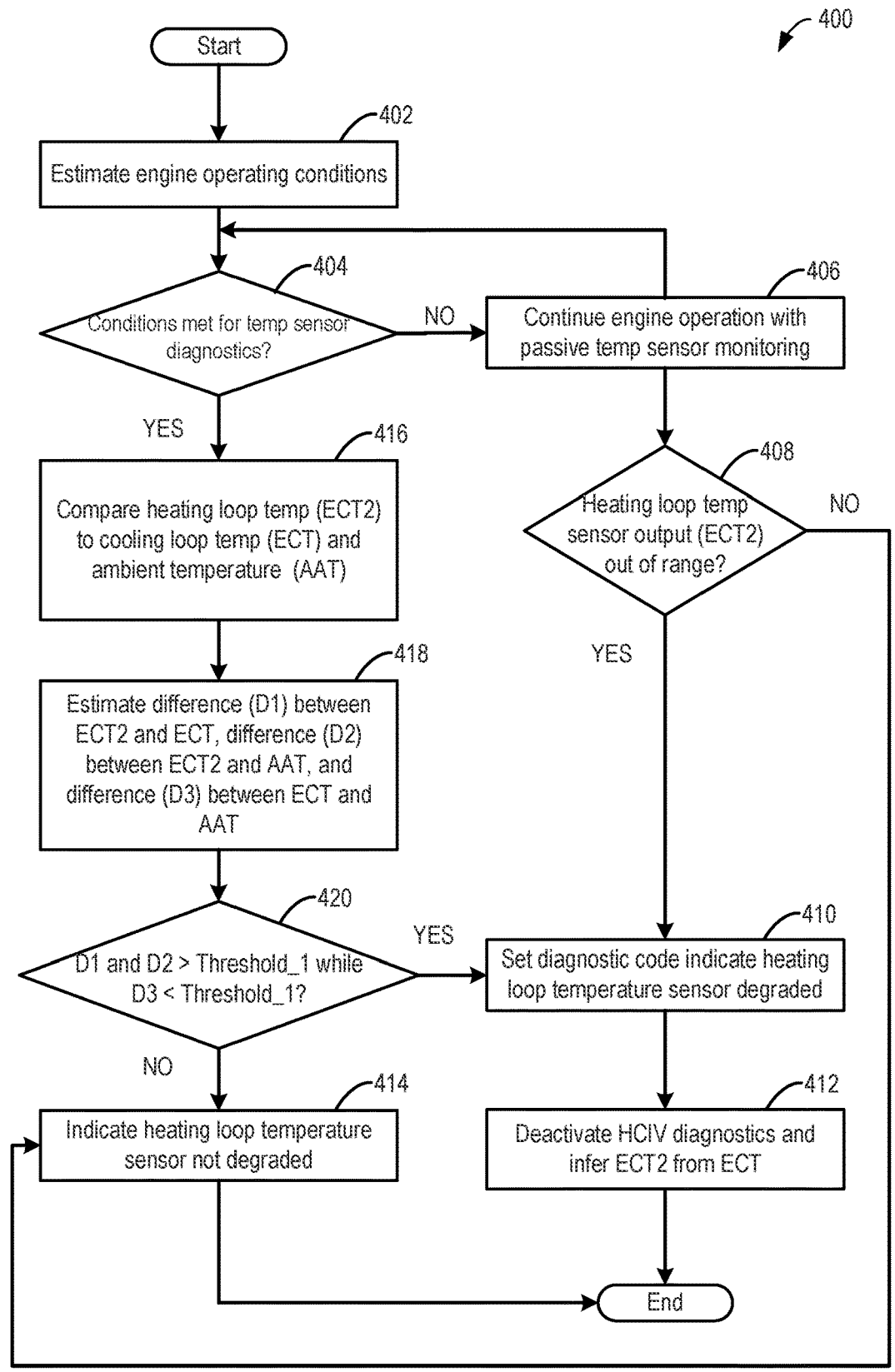
FIG. 4 shows a flow chart illustrating an example method that can be implemented to carry out a coolant system temperature sensor diagnostics.

FIG. 4 shows an example method 400 for carrying out a coolant system temperature sensor diagnostics. The coolant system temperature sensor (such as temperature sensor 244 in FIG. 2) may be coupled to a coolant line in the cabin heating loop, downstream of a PTC heater. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, current vehicle and engine operating conditions may be estimated and/or measured. These may include, for example, operator torque demand, engine speed, vehicle speed, engine temperature, engine temperature, engine load, ambient conditions (such as ambient humidity, temperature, and barometric pressure), exhaust temperature, manifold pressure, manifold air flow, battery state of charge, etc.

At 404, the routine includes determining if conditions are met for coolant temperature sensor diagnostics. The conditions may include an engine start after a longer than threshold duration of vehicle and engine inactivity. A longer than threshold soak time since the immediately previous engine shut down provides opportunity for the engine components to cool down and equilibrate with ambient temperature. The threshold soak time may be pre calibrated based on engine temperature and ambient temperature. In one example, the condition for carrying out the diagnostics may include a cold-start condition.

The conditions may include an engine cooling loop temperature (ECT) and ambient temperature (AAT) being within a tolerance range. ECT may be estimated as a function of outputs of an engine cylinder head temperature sensor and/or cylinder cooling sleeve temperature sensor and AAT may be estimated based on output of an ambient temperature sensor. After a long soak, the engine coolant temperature may equilibrate with ambient temperature and may be within a pre-calibrated tolerance range (such as ±27° C.).

If it is determined that conditions are not met for coolant temperature sensor diagnostics, at 406, engine operation may be continued without active temperature sensor diagnostics. Engine may be operated by combusting fuel in engine cylinders. During engine operation, a continuous, passive monitoring of the coolant temperature sensor may be carried out.

As an example, upon confirmation that the engine temperature, as inferred based on inputs from a temperature sensor coupled to a cylinder coolant jacket and/or a cylinder head, has increased above a threshold temperature (warm engine), a passive temperature sensor monitoring may be carried out. When the engine is warm, the output of the coolant temperature sensor (ECT2) coupled to the cabin heating loop of the coolant system, upstream of a heater core, may remain within a pre-determined range based on engine operating conditions and position of a heater core isolation valve (such as HCIV 236 in FIG. 2) separating the engine cooling loop and the cabin heating loop of the coolant system.

At 408, the routine includes determining if the output (ECT2) of the cabin heating loop coolant temperature sensor is out of range from an anticipated (modelled) temperature corresponding to current engine operating conditions. As an example, a range may include a ±17° C. from the anticipated temperature. The controller may estimate the anticipated temperature based on engine operating conditions (such as engine load, engine speed), HCIV position (such as open, allowing coolant flow through both engine cooling loop and cabin heating loop, or closed, isolating the cabin heating loop), and engine cooling loop temperature (ECT) estimated based on output of an engine cylinder head temperature sensor or cylinder cooling sleeve temperature sensor by using a look-up table with engine operating conditions, ECT, and HCIV position as input and anticipated temperature as output. The anticipated temperature may change based on engine operating conditions.

In one example, based on engine operating conditions and an open state of the HCIV, the anticipated ECT2 may be 60° C. (thermostat regulating temp), however if it is observed that ECT2 is outside the range of −40° C. and 70° C., it may be inferred that the cabin heating loop coolant temperature sensor is degraded. Further, it may be monitored if ECT2 is out of range for a higher than threshold duration.

If it is determined that the cabin heating loop temperature sensor output (ECT2) is not out of range, at 414, it may be indicated that the cabin heating loop temperature sensor is not degraded and HCIV diagnostics (actively or passively) may be subsequently carried out. If it is determined that the cabin heating loop temperature sensor output (ECT2) is out of range for a higher than threshold duration, at 410, a diagnostic code may be set indicating that the cabin heating loop temperature sensor is degraded.

At 412, due to the degradation of the cabin heating loop temperature sensor, subsequent HCIV diagnostics may be deactivated until the cabin heating loop temperature sensor is serviced. Also, during the time period when the cabin heating loop temperature sensor is degraded, ECT2 may be modelled based on the engine operating conditions, HCIV position, and the engine cooling loop temperature (ECT). The routine may then end.

If at 404, if it is determined that conditions are met for actively diagnosing the cooling system, at 416, cabin heating loop temperature (ECT2) may be compared to each of the engine cooling loop temperature (ECT) and ambient temperature (AAT). ECT2 may be the output of the cabin heating loop temperature sensor, ECT may be estimated as a function of outputs of an engine cylinder head temperature sensor and/or cylinder cooling sleeve temperature sensor, and AAT may be estimated based on output of an ambient temperature sensor. After a long soak or at a cold-start, temperature at different engine locations may equilibrate with ambient temperature. Therefore, ECT, ECT2, and AAT may be within a threshold range. As an example, each of the ECT, ECT2, and AAT may be within a ±5° C. from each other. In one example, if ECT may be recorded as 13° C., ECT2 may be recorded as 14° C., and AAT may be recorded as 12° C.

At 418, a first absolute difference (D1) may be estimated between ECT2 and ECT, a second absolute difference (D2) may be estimated between ECT2 and AAT, and a third absolute difference (D3) may be estimated between ECT and AAT. At 420, the routine includes determining if each D1 and D2 is higher than a first threshold difference (threshold_1) while D3 is lower than the first threshold difference (threshold_1). Threshold_1 may be pre-calibrated based on sensitivities of cabin heating loop temperature sensor, ambient temperature sensor, engine cylinder head temperature sensor, and cylinder cooling sleeve temperature sensor. In one example, threshold_1 may be −27° C.

If it is determined that the each D1 and D2 is higher than threshold_1 while D3 is lower than threshold_1, it may be inferred that ECT2 is out of range from ECT and AAT while ECT and AAT are within a tolerance range and the routine may proceed to 410 wherein a diagnostic code may be set indicating that the cabin heating loop temperature sensor is degraded.

If it is determined that each D1, D2, and D3 are lower than threshold_1, it may be inferred that the temperature sensor is providing accurate outputs and the routine may proceed to 414 wherein it is indicated that the cabin heating loop temperature sensor is not degraded. In this way, rationality of the cabin heating loop temperature sensor may be opportunistically and continually monitored.

Figure 5:
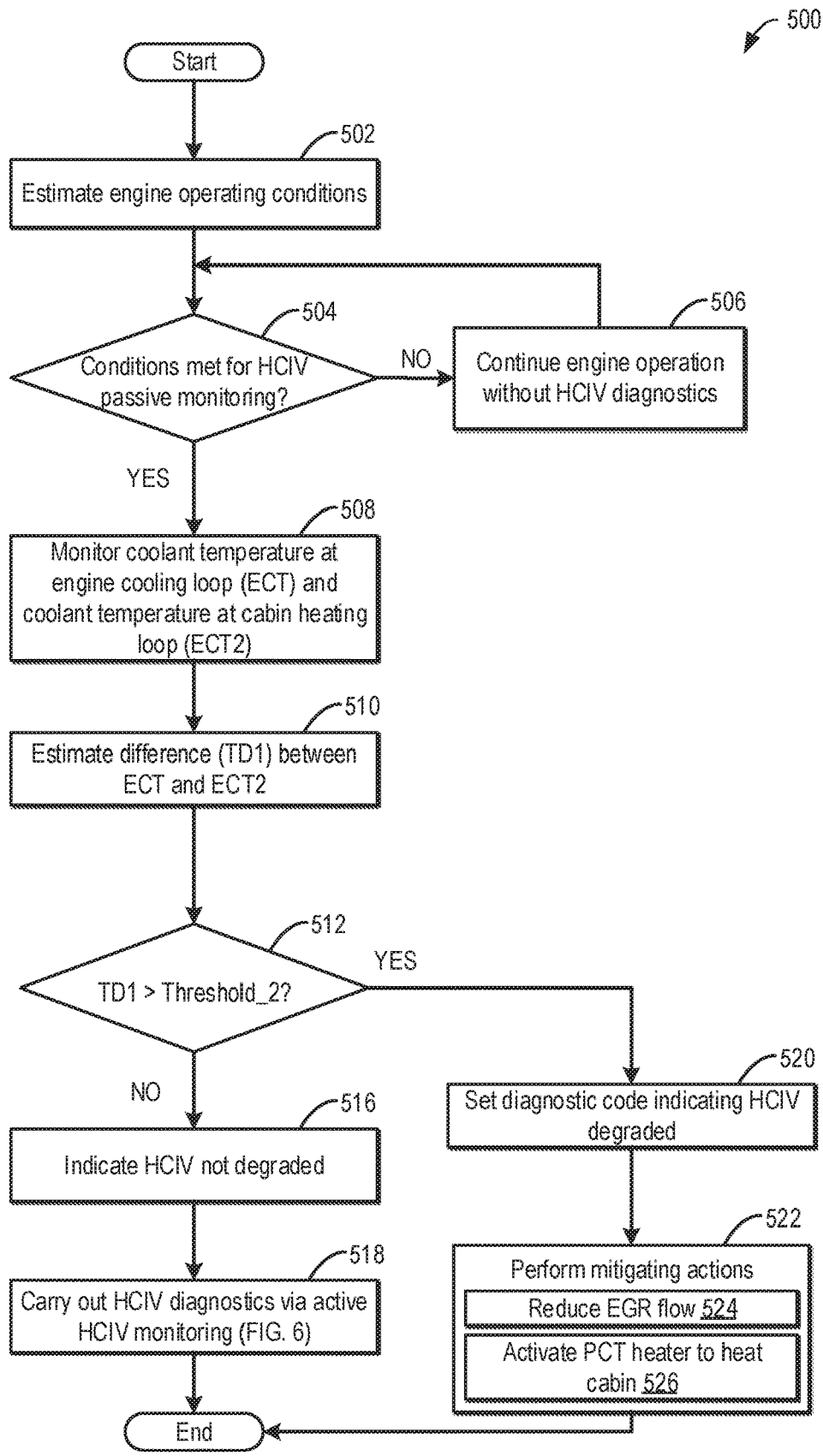
FIG. 5 shows a flow chart illustrating an example method that can be implemented to carry out passive monitoring of the HCIV.

FIG. 5 shows an example method 500 to carry out passive monitoring of the heater core isolation valve (such as HCIV 236 in FIG. 2). The HCIV may separate an engine cooling loop (such as engine cooling loop 201 in FIG. 2) and a cabin heating loop (such as cabin heating loop 230 in FIG. 2) and may be actuated to an open position by de-energizing a solenoid in the valve or a closed position by energizing the solenoid. In the open position of the HCIV, the coolant may flow in a primary coolant circuit including both the engine cooling loop and the cabin heating loop including the engine, the heater core, the radiator, and the EGR cooler. In the closed position of the HCIV, the coolant may circulate with a secondary circuit solely including the cabin heating loop and coolant flow through the EGR cooler is restricted.

At 502, current vehicle and engine operating conditions may be estimated and/or measured. These may include, for example, operator torque demand, engine speed, vehicle speed, engine temperature, engine temperature, engine load, ambient conditions (such as ambient humidity, temperature, and barometric pressure), exhaust temperature, manifold pressure, manifold air flow, battery state of charge, etc.

At 504, the routine includes determining if conditions are met for HCIV passive monitoring. The conditions may include stabilization of engine operation following an engine start. In one example, stabilization conditions may include no input component degradations. A stabilization timer may be used to determine if engine operation has stabilized. The timer may be incremented at a calibrated rate each time the stabilization conditions are met and the timer may be decremented at a different, calibrated rate each time the stabilization conditions are not met. Conditions for HCIV passive monitoring may be met when the stabilization timer accumulates a threshold time. In one example, the HCIV diagnostics may be carried out if the timer accumulates 5 minutes (engine operation stabilized for at least 5 minutes).

The conditions for HCIV passive monitoring further include a higher than threshold EGR flow, a higher than threshold speed of a main pump (such as main pump 212 in FIG. 2), and an open position of the HCIV. During engine start, EGR flow may not be desired. Subsequently, after an exhaust catalyst attains its light-off temperature, EGR flow may be increased based on engine operating conditions such as engine speed, engine temperature, and engine load. A higher than threshold EGR flow and a higher than threshold EGR temperature as estimated via an EGR temperature sensor ensures a steady coolant flow through the EGR cooler where heat is transferred from the exhaust gas to the coolant circulating through the cooler. Also, a higher than threshold speed of a main pump (such as main pump 212 in FIG. 2) is desired to ensure coolant flow through the primary circuit. In the open position of the HCIV, the same coolant flows through the primary circuit.

The conditions for HCIV passive monitoring also includes a higher than threshold ambient temperature such that the diagnostics may not be carried out during a lower than threshold temperature (such as below 28° C.) or a higher than threshold temperature (such as above 45° C.). Also, it may be ensured that diagnostic system manager (DSM) is enabled during engine operation (such as diagnostic executive (DIAGX) is active and ready.

Prior to enablement of the HCIV diagnostics, the controller may make sure that a coolant loop temperature sensor, engine cylinder head temperature sensor, and cylinder cooling sleeve temperature sensor are not degraded.

If conditions are not met for HCIV passive monitoring, at 506, engine operation may be continued without passively monitoring the HCIV. Engine cooling loop temperature (ECT) may be estimated (such as modeled) as a function of on output of an engine cylinder head temperature sensor and/or cylinder cooling sleeve temperature sensor. Alternatively, ECT may be estimated based on an output of a temperature sensor coupled to the engine cooling loop downstream of the engine. Cabin heating loop temperature (ECT2) may be estimated based on an output of an engine coolant temperature sensor coupled to the cabin heating loop downstream of a PTC heater.

If it is determined that conditions are met for HCIV passive monitoring, at 508, coolant temperature at the engine cooling loop (engine cooling loop temperature ECT) and coolant temperature at the cabin heating loop (cabin heating loop temperature ECT2) may be monitored. Monitoring of ECT and ECT2 may be continued during the entire course of the drive cycles when the conditions are met for HCIV passive monitoring. As an example, during engine operation with the coolant circulating in the primary circuit with HCIV open, ECT may be marginally higher (such as ECT 2 may be 10% lower than ECT) than ECT2 and changes in ECT2 may follow any changes in ECT.

At 510, a fourth absolute difference (TD1) may be estimated between ECT and ECT2. As an example, while the monitoring of ECT and ECT2 are carried out continuously, the difference estimation may be carried out periodically (such as every 10 seconds).

At 512, the routine includes determining if the difference (TD1) between ECT and ECT2 is greater than a second threshold difference (threshold 2). Threshold_2 may be calibrated based on engine operating conditions such as engine load and engine speed and PTC heater operation. If it is determined that the TD1 is lower than the second threshold difference (threshold 2), it may be inferred that coolant is flowing through each of the engine cooling loop and the cabin heating loop via the HCIV and ECT is following ECT2 as expected with a lower than threshold difference between the engine cooling loop temperature and the cabin heating loop temperature. At 516, it may be indicated that the HCIV is not degraded and engine operations may be continued. Subsequent to the passive HCIV monitoring at 518, HCIV diagnostics may be opportunistically carried out via an HCIV active monitoring routine. The active monitoring may be carried out upon conditions being met for the routine. The active monitoring of the HCIV is elaborated in FIG. 6.

If it is determined that TD1 is higher than the second threshold difference (threshold 2), it may be inferred that the HCIV is stuck in a closed position, thereby blocking coolant from the engine cooling loop to travel to the cabin heating loop. In the absence of coolant from the engine cooling loop, stagnated coolant may circulate through the cabin heating loop. Since coolant exiting the engine is at a higher temperature, and the higher temperature coolant is not able to circulate through the cabin heating loop, the temperature of coolant in the cabin heating loop may decrease. Heat from the stagnated coolant circulating through the cabin heating loop may be transferred to the heating core, thereby further reducing the temperature of the coolant in the cabin heating loop without the addition of warmer coolant from the engine cooling loop.

Therefore, upon determination that TD1 is higher than threshold 2, at 520, HCIV degradation may be indicated by setting a flag/diagnostic code. Subsequent to the detection of HCIV degradation via the passive monitoring routine, at 522, mitigating actions may be performed to reduce the adverse effects of the HCIV degradation until the HCIV is serviced. Mitigating actions may include, at 524, reducing or halting EGR flow to reduce heat transfer from EGR gases to the coolant that may lead to thermal stress at an EGR cooler. Engine operations may be adjusted to compensate for the reduced or lack of EGR flow to maintain emissions below a threshold level of emissions. The threshold level of emissions may be a preset concentration of substances such as CO, NOx, etc., as detected by corresponding sensors in an exhaust manifold of the PHEV. Since coolant with engine heat and/or exhaust gas heat (from cooling EGR) is no longer circulated through the heater core, in order to provide any cabin heating, the mitigating (compensating) actions may further include, at 526, activating the PTC heater to provide a desired cabin heating. The mitigating actions may be continued until the controller is notified that the HCIV is repaired or replaced.

Figure 6:
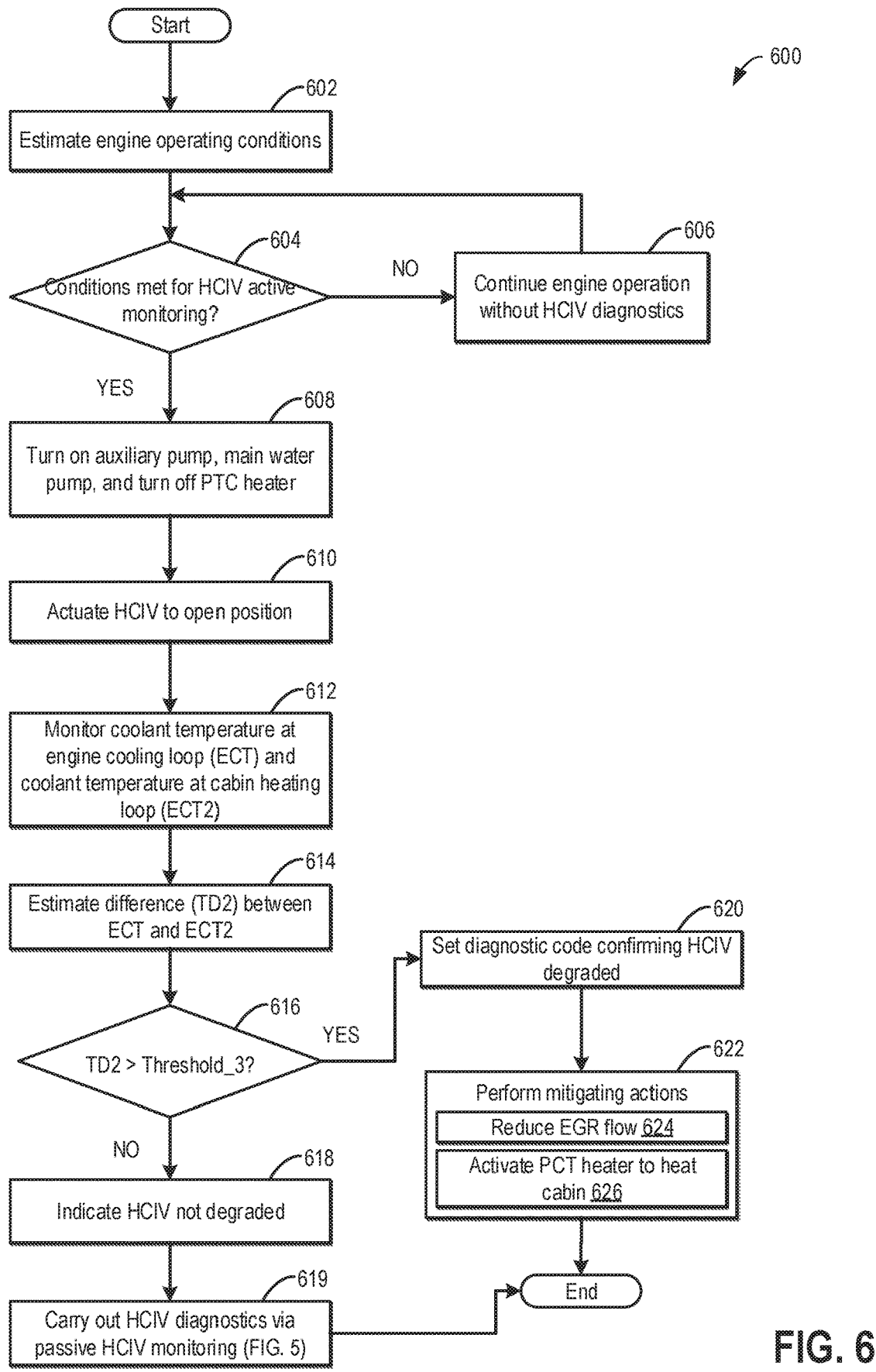
FIG. 6 shows a flow chart illustrating an example method that can be implemented to carry out active monitoring of the HCIV.

FIG. 6 shows an example method 600 to carry out active monitoring of the heater core isolation valve (such as HCIV 236 in FIG. 2). The HCIV may separate an engine cooling loop (such as engine cooling loop 201 in FIG. 2) and a cabin heating loop (such as cabin heating loop 230 in FIG. 2) and may be actuated to an open position by de-energizing a solenoid in the valve or a closed position by energizing the solenoid. In the open position of the HCIV, the coolant may flow in a primary coolant circuit including both the engine cooling loop and the cabin heating loop including the engine, the heater core, the radiator, and the EGR cooler. In the closed position of the HCIV, the coolant may circulate with a secondary circuit solely including the cabin heating loop and coolant flow through the EGR cooler is restricted.

At 602, current vehicle and engine operating conditions may be estimated and/or measured. These may include, for example, operator torque demand, engine speed, vehicle speed, engine temperature, engine temperature, engine load, ambient conditions (such as ambient humidity, temperature, and barometric pressure), exhaust temperature, manifold pressure, manifold air flow, battery state of charge, etc.

At 604, the routine includes determining if conditions are met for HCIV active monitoring. In one example, active monitoring of the HCIV is desired to be carried out one per drive cycle (such as in the beginning of a drive cycle) as soon as conditions are met for the HCIV active monitoring. After the active monitoring of the HCIV is complete, passive monitoring of the HCIV may be carried out throughout the drive cycle. In another example, active monitoring of the HCIV is desired to be carried out every time the HCIV is actuated from the closed position to the open position.

The conditions for HCIV active monitoring may include stabilization of engine operation following an engine start. In one example, stabilization conditions may include no input component degradation, a higher than threshold coolant temperature at engine cooling loop, and a higher than threshold ambient temperature A stabilization timer may be used to determine if engine operation has stabilized. The timer may be incremented at a calibrated first rate each time the stabilization conditions are met and the timer may be decremented at a different, second, calibrated rate each time the stabilization conditions are not met. Conditions for HCIV active monitoring may be met as soon as the stabilization timer accumulates a threshold time. In one example, the HCIV diagnostics may be carried out if the timer accumulates 5 minutes (engine operation stabilized for at least 5 minutes).

Also, it may be ensured that diagnostic system manager (DSM) is enabled during engine operation (such as Diagnostic Executive (DIAGX) is active and ready).

Conditions for HCIV active monitoring may also include a higher than threshold EGR flow rate. Prior to enablement of the HCIV diagnostics, the controller may make sure that a coolant loop temperature sensor, engine cylinder head temperature sensor, and cylinder cooling sleeve temperature sensor are not degraded.

If conditions are not met for HCIV active monitoring, at 606, engine operation may be continued without actively monitoring the HCIV. Engine cooling loop temperature (ECT) may be estimated (such as modeled) as a function of on output of an engine cylinder head temperature sensor and/or cylinder cooling sleeve temperature sensor. Alternatively, ECT may be estimated based on an output of a temperature sensor coupled to the engine cooling loop downstream of the engine. Cabin heating loop temperature (ECT2) may be estimated based on an output of an engine coolant temperature sensor coupled to the cabin heating loop downstream of a PTC heater.

If it is determined that conditions are met for HCIV active monitoring, at 608, an auxiliary pump (such as auxiliary pump 242 in FIG. 2) coupled to the cabin heating loop and a main pump (such as main pump 212 in FIG. 2) coupled to the engine cooling loop may be turned on and a positive temperature coefficient heater (such as PTC heater 232 in FIG. 2) may be turned off. The controller may send a signal to respective actuators coupled to the auxiliary pump and the main pump to activate each of the auxiliary pump and the main pump. If the PTO heater was operational, the controller may send a signal to the actuator of the PTC heater to turn off the PTC heater. By turning on the pumps in each of the engine cooling loop and the cabin heating loop, circulation of coolant in each of the loops is improved. By turning off the PTC heater, the heating source in the cabin heating loop is removed and the coolant is solely heated by extracting heat from the engine. The coolant with the engine heat is then circulated (without added heat from the PTC heater) through the radiator and/or the heater core.

At 610, the HCIV may be actuated to an open position (if the HCIV was previously in a closed position). The controller may send a signal to the actuator of the HCIV to actuate the HCIV to a completely open position. At 612, temperature at the engine cooling loop (engine cooling loop temperature ECT) and coolant temperature at the cabin heating loop (cabin heating loop temperature ECT2) may be monitored. As an example, during engine operation with the coolant circulating in the primary circuit with HCIV open, ECT may be marginally higher (such as ECT 2 may be 10% lower than ECT) than ECT2 and changes in ECT2 may follow any changes in ECT. At 614, a fifth absolute difference (TD2) may be estimated between ECT and ECT2.

At 614, the routine includes determining if the difference (TD2) between ECT and ECT2 is greater than a third threshold difference (threshold 3). Threshold_3 may be calibrated based on engine operating conditions such as engine load and engine speed. If it is determined that the threshold difference is lower than the third threshold difference (threshold 3), it may be inferred that coolant is flowing through each of the engine cooling loop and the cabin heating loop via the HCIV and ECT is following ECT2 as expected with a lower than threshold difference between the engine cooling loop temperature and the cabin heating loop temperature. At 618, it may be indicated that the HCIV is not degraded and engine operations may be continued. Subsequent to the detection of HCIV not degraded via the active monitoring routine, at 619, HCIV diagnostics may be carried out via an HCIV passive monitoring routine (as elaborated in FIG. 5). The passive monitoring may be opportunistically carried out throughout the drive cycle upon conditions being met for passive monitoring the HCIV.

If it is determined that TD2 is higher than the third threshold difference (threshold 3), it may be inferred that the HCIV is stuck in a closed position, thereby blocking warm coolant from the engine cooling loop to travel to the cabin heating loop. In the absence of coolant from the engine cooling loop, stagnated coolant may circulate through the cabin heating loop. Since coolant exiting the engine is at a higher temperature, and the higher temperature coolant is not able to circulate through the cabin heating loop, the temperature of coolant in the cabin heating loop may decrease. Also, since the PTC heater is off, heat is not added to the coolant circulating through the cabin heating loop, thereby causing coolant temperature to further decrease as heat is transferred to the heater core.

Therefore, upon determination that TD2 is higher than threshold 3, at 620, HCIV degradation may be indicated by setting a flag/diagnostic code. Subsequent to the detection of HCIV degradation, at 622, mitigating actions may be performed to reduce the adverse effects of the HCIV degradation until the HCIV is serviced. Mitigating actions may include, at 624, reducing or halting EGR flow to reduce heat transfer from EGR gases to the coolant that may lead to thermal stress at an EGR cooler. Engine operations may be adjusted to compensate for the reduced or lack of EGR flow to maintain emissions below a threshold level of emissions. The threshold level of emissions may be a preset concentration of substances such as CO, NOx, etc., as detected by corresponding sensors in an exhaust manifold of the PHEV. Since coolant with engine heat and/or exhaust gas heat (from cooling EGR) is no longer circulated through the heater core, in order to provide any cabin heating, the mitigating (compensating) actions may further include, at 626, activating the PTC heater to provide a desired cabin heating. The mitigating actions may be continued until the controller is notified that the HCIV is repaired or replaced.

In this way, during a first condition, a first difference may be estimated between an engine cooling loop temperature and a cabin heating loop temperature, a second difference may be estimated between the cabin heating loop temperature and an ambient temperature, and degradation of a temperature sensor coupled to a cabin heating loop may be indicated in response to one or both of the first difference and the second difference being higher than a first threshold difference and second difference (between cabin heating loop temperature and ambient temperature) is less than first threshold difference, and during a second condition, each of a main pump coupled to an engine cooling loop and an auxiliary pump coupled to the cabin heating loop may be activated, a positive temperature coefficient (PTC) heater coupled to the cabin heating loop may be deactivated, a heater core isolation valve (HCIV) coupled at a junction of the cabin heating loop and the engine cooling loop may be actuated to an open position, the first difference between the engine cooling loop temperature and the cabin heating loop temperature may be estimated, and the HCIV may be indicated as stuck in a closed condition in response to the first difference being higher than a second threshold difference, the second threshold difference different from the first threshold difference. The first condition includes engine start after a longer than threshold period of vehicle inactivity and a second difference between the engine cooling loop temperature and the ambient temperature being lower than a third threshold difference, the third threshold difference lower than each of the first threshold difference and the second threshold difference and the second condition includes a non-degraded condition of the temperature sensor coupled to the cabin heating loop and a higher than threshold time accumulated in an engine stabilization timer.

FIG. 7 shows an example plot 700 of cooling loop temperature and cabin heating loop temperature upon degradation of the heater core isolation valve (HCIV). Line 702 shows temperature (ECT) in the engine cooling loop. Engine cooling loop temperature (ECT) may be estimated (such as modeled) as a function of on output of an engine cylinder head temperature sensor and/or cylinder cooling sleeve temperature sensor. Alternatively, ECT may be estimated based on an output of a temperature sensor coupled to the cooling loop downstream of the engine. Line 704 shows temperature (ECT2) in the cabin heating loop. ECT2 may be estimated based on an output of an engine coolant temperature sensor coupled to the cabin heating loop downstream of a PTC heater.

Prior to time t1, the HCIV is in an open position causing coolant to flow through the combination of the cabin heating loop and the engine cooling loop. ECT and ECT2 closely follow each other as the same coolant flows through each of the engine cooling loop and the cabin heating loop. However, at time t1, due to a degradation of the HCIV, the HCIV is stuck in a closed position. Once the HCIV is stuck closed, ECT and ECT2 is seen to diverge. Since the heat extracted from the engine and the exhaust gas (at the EGR cooler) is no longer transferred to the cabin heating loop and heat from the stagnated coolant in the cabin heating loop is transferred to the heater core, temperature of coolant in the cabin heating loop progressively reduces causing a difference between ECT and ECT2 to increase. A degradation of the HCIV may also be confirmed in response to a higher than threshold rate of decay in ECT2 upon HCIV degradation.

FIG. 8 shows an example timeline 800 for a heater core isolation valve (such as HCIV 236 in FIG. 2). The first plot, line 802, shows a change in engine speed as estimated via a crankshaft position sensor. The second plot, line 804, shows a change in engine exhaust temperature as estimated via an exhaust temperature sensor. Dashed line 805 denotes a threshold temperature at which exhaust catalyst may attain light-off temperature. Below the threshold temperature, the engine operation may be designated as a cold-start. The third plot, line 806, shows a position of the HCIV. The HCIV may separate an engine cooling loop (such as engine cooling loop 201 in FIG. 2) and a cabin heating loop (such as cabin heating loop 230 in FIG. 2) and may be actuated to an open position by de-energizing a solenoid in the valve or a closed position by energizing the solenoid. In the open position of the HCIV, the coolant may flow in a primary coolant circuit including both the engine cooling loop and the cabin heating loop including the engine, the heater core, the radiator, and the EGR cooler. In the closed position of the HCIV, the coolant may circulate with a secondary circuit solely including the cabin heating loop and coolant flow through the EGR cooler is restricted. The fourth plot, line 808 shows operation of a main pump (such as pump 212 in FIG. 2) housed in the engine cooling loop. The fifth plot, line 810 shows operation of an auxiliary pump (such as pump 242 in FIG. 2) housed in the engine cooling loop. The sixth plot, line 812, shows operation of a positive temperature coefficient heater (such as PTC heater 232 in FIG. 2). The seventh plot, line 814, shows a rate of exhaust gas recirculation (EGR) as estimated via an EGR sensor coupled to an EGR line recirculating exhaust gas from the engine exhaust passage to the engine intake. Dashed line 815 corresponds to a threshold EGR rate above which HCIV active monitoring may be carried out. The eighth plot, line 816, shows engine cooling loop temperature (ECT) as modeled as a function of on output of an engine cylinder head temperature sensor and/or cylinder cooling sleeve temperature sensor. Dashed line 818 shows cabin heating loop temperature (ECT2) as estimated based on an output of an engine coolant temperature sensor coupled to the cabin heating loop downstream of a PTC heater. The ninth plot, line 822, shows a flag denoting a diagnostic code for a degraded HCIV.

Prior to time t1, the engine is not operational and each of the main pump, the auxiliary pump, and the PTC heater are maintained in an inactive state. The HCIV may be in a closed position and EGR may not be supplied. ECT and ECT2 may not be monitored and since a degradation of the HCIV has not been determined, the flag may be maintained in an off condition.

At time t1, the engine is started from rest. In response to the lower than threshold 805 exhaust temperature, a cold start may be inferred. The main pump and the auxiliary pump are activated to circulate coolant through the cabin heating loop and the coolant loop. The HCIV is maintained in a closed position and the PTC heater is operated to provide heat to the heater core. Between time t1 and t2, the exhaust temperature, engine cooling loop temperature, and the cabin heating loop temperature gradually increases.

At time t2, the exhaust temperature increases to above the threshold temperature 805 and the HCIV is actuated to an open position. Also, EGR supply is initiated, the EGR cooled via an EGR cooler housed in the engine coolant circuit. Responsive to opening of the HCIV, the same coolant may circulate through each of the engine cooling loop and the cabin heating loop.

At time t3, in response to the EGR rate increasing above the threshold rate 515, active HCIV monitoring may be initiated. HCIV monitoring may be carried out between time t3 and t4. The PTC is deactivated and each of the main pump and auxiliary pump may be continued to be operated to route the same coolant through each of the engine cooling loop and the cabin heating loop via the open HCIV. Between t3 and t4, it is observed that ECT and ECT2 closely follow each other without ECT2 deviating from ECT, thereby confirming that the HCIV is not stuck in a closed position. Since a degradation of the HCIV is not detected, the flag is maintained in a deactivated condition.

However, if it is detected that during the active monitoring of HCIV, ECT2 reduces and deviates from ECT at a higher than threshold rate, as shown by dotted line 820, a degradation of the HCIV could have been detected and a flag would have been set at the end of the monitoring period, t4. At time t4, active monitoring of HCIV (as described in method 500 in FIG. 5) is discontinued and engine operation may be continued. Passive monitoring of the HCIV may be continued throughout the drive cycle.

In this way, HCIV may be monitored passively and actively during a drive cycle to effectively detect any degradation without a delay. By using existing engine sensors for HCIV diagnostics, cost and complexity of additional hardware may be reduced. Also, by monitoring a status of a temperature sensor coupled to the engine coolant system, robustness of the engine coolant system may be improved. The technical effect of continually monitoring the HCIV is that EGR cooling/supply may not be adversely affected and in presence of a degradation, mitigating actions may be carried out without delay, thereby maintaining integrity of EGR apparatus and a desired emissions quality.

In one example, a method, comprises: indicating degradation of a coolant system valve coupling a first coolant loop and a second coolant loop based on a first difference between a first coolant loop temperature and a second coolant loop temperature responsive to selective operation of coolant system pumps and a positive temperature coefficient (PTC) heater. In the preceding example method, additionally or optionally, the coolant system valve is actuated to a first, open position to circulate coolant through each of the first coolant loop and the second coolant loop and wherein the coolant system valve is actuated to a second, closed position to separate coolant flow from the second coolant loop to the first coolant loop. In any or all of the preceding examples, additionally or optionally, the first coolant loop temperature is a temperature of coolant flowing through the first coolant loop as estimated based on inputs from a cylinder head temperature sensor and/or a cylinder cooling sleeve temperature sensor, and the second coolant loop temperature is a temperature of coolant flowing through the second coolant loop, as estimated based on inputs of a coolant temperature sensor housed in the second loop. In any or all of the preceding examples, additionally or optionally, the first coolant loop includes an engine, a main pump, a degas bottle, a radiator, and an EGR cooler, and wherein the second coolant loop includes the PTC heater, a heater core, an auxiliary pump, and the coolant temperature sensor. In any or all of the preceding examples, additionally or optionally, selective operation of the coolant system pumps and the PTC heater includes, during an active monitoring of the coolant system valve, activating each of the main pump and the auxiliary pump, and deactivating the PTC heater. In any or all of the preceding examples, additionally or optionally, the indicating degradation includes indicating the valve as degraded in response to the first difference being higher than a first threshold during the active monitoring of the coolant system valve. In any or all of the preceding examples, additionally or optionally, the active monitoring is carried out once during a drive cycle upon confirmation that the coolant temperature sensor housed in the second loop is not degraded. In any or all of the preceding examples, the method further comprising, additionally or optionally, after completion of the active monitoring of the coolant system valve, throughout the drive cycle, comparing the first difference between the first coolant loop temperature and the second coolant loop temperature to a second threshold, and indicating degradation of the coolant system valve in response to the first difference being higher than the second threshold, the second threshold different from the first threshold. In any or all of the preceding examples, the method further comprising, additionally or optionally, throughout the drive cycle, monitoring a status of the coolant temperature sensor housed in the second loop by comparing the output of the coolant temperature sensor to an anticipated coolant temperature, and detecting degradation of the coolant temperature sensor in response to the output of the coolant temperature sensor being out of range of the anticipated temperature, the anticipated temperature modelled based on engine speed, engine load, first or second position of the coolant system valve, and the temperate in first coolant loop temperature. In any or all of the preceding examples, the method further comprising, additionally or optionally, after a longer than threshold period of engine inactivity, comparing the first difference between the first coolant loop temperature and the second coolant loop temperature to a third threshold, comparing a second difference between the second coolant loop temperature and ambient temperature to the third threshold, and indicating degradation of the coolant temperature sensor housed in the second loop in response to one or both of the first difference and the second difference being higher than the third threshold. In any or all of the preceding examples, additionally or optionally, degradation of the coolant system valve includes the coolant system valve stuck in a closed position inhibiting coolant flow from the first coolant loop to the second coolant loop through the EGR passage. In any or all of the preceding examples, the method further comprising, additionally or optionally, in response to degradation of the coolant system valve, reducing EGR flow to engine cylinders and notifying a vehicle operator.

Another example method comprises: during a first condition, estimating a first difference between an engine cooling loop temperature and a cabin heating loop temperature, estimating a second difference between the cabin heating loop temperature and an ambient temperature, and indicating degradation of a temperature sensor coupled to a cabin heating loop in response to one or both of the first difference and the second difference being higher than a first threshold difference, and during a second condition, activating each of a main pump coupled to an engine cooling loop and an auxiliary pump coupled to the cabin heating loop, deactivating a positive temperature coefficient (PTC) heater coupled to the cabin heating loop, actuating a heater core isolation valve (HCIV) coupled at a junction of the cabin heating loop and the engine cooling loop to an open position, estimating the first difference between the engine cooling loop temperature and the cabin heating loop temperature, and indicating the HCIV stuck in a closed condition in response to the first difference being higher than a second threshold difference, the second threshold difference different from the first threshold difference. In the preceding example method, additionally or optionally, the first condition includes engine start after a longer than threshold period of vehicle inactivity and a second difference between the engine cooling loop temperature and the ambient temperature being lower than a third threshold difference, the third threshold difference lower than each of the first threshold difference and the second threshold difference, and wherein the second condition includes a non-degraded condition of the temperature sensor coupled to the cabin heating loop and a higher than threshold time accumulated in an engine stabilization timer. In any or all of the preceding examples, additionally or optionally, the stabilization timer is incremented at a first rate when one or more engine stabilization conditions are met during a drive cycle and the stabilization timer is decremented at a different, second, rate when the one or more engine stabilization conditions are not met during the drive cycle, the stabilization conditions including a higher than threshold speed of the main pump and a higher than threshold ambient temperature. In any or all of the preceding examples, additionally or optionally, the engine cooling loop includes an engine, the main pump, a degas bottle, a radiator, and an EGR cooler, and wherein the cabin heating loop includes the PTC heater, a heater core, the auxiliary pump, and the temperature sensor. In any or all of the preceding examples, additionally or optionally, the closed condition of the HCIV includes a solenoid of the HCIV in a de-energized state inhibiting coolant flow from the cabin heating loop to the engine cooling loop, and wherein an open condition of the HCIV includes the solenoid of the HCIV in an energized state enabling coolant flow between the cabin heating loop and the cooling loop.

In yet another example, a system for an engine, comprises: a controller with computer readable instruction stored on non-transitory memory that, when executed, cause the controller to: activate a main pump coupled to an engine cooling loop of a coolant system, activate an auxiliary pump coupled to a cabin heating loop of the cooling system, deactivate a positive temperature coefficient (PTC) heater coupled to the cabin heating loop, actuate a heater core isolation valve (HCIV) coupling the engine cooling loop and the cabin heating loop to an open position to allow coolant to flow between the engine cooling loop and the cabin heating loop, estimate a cabin heating loop coolant temperature as a function of an output of a cylinder head temperature sensor and/or an output of a cylinder cooling sleeve temperature sensor, estimate a cooling loop coolant temperature based on an output of a cooling loop temperature sensor coupled to the cooling loop, estimate a difference between the cabin heating loop temperature and the cooling loop temperature, and indicate the HCIV struck in a closed position in response to the difference being higher than a threshold difference. In the preceding example system, additionally or optionally, in the open position of the HCIV, the coolant exiting the engine bifurcates with a first portion of coolant flowing through each of an EGR cooler, a three-way junction in the cabin heating loop, the auxiliary pump, the PTC heater, a heater core, the HCIV, an engine oil cooler, and the main pump prior to returning to the engine, and a second portion of coolant flowing through each of a radiator, a degas bottle, and the main pump prior to returning to the engine. In any or all of the preceding examples, additionally or optionally, in the closed position of the HCIV, the coolant circulates through the auxiliary pump, the PTC heater, the heater core, the HCIV, and the three-way junction without returning to the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
indicating degradation of a coolant system valve coupling a first coolant loop and a second coolant loop based on a first difference between a first coolant loop temperature and a second coolant loop temperature responsive to selective operation of coolant system pumps and a positive temperature coefficient (PTC) heater, wherein the selective operation of the coolant system pumps includes, during an active monitoring of the coolant system valve, activating each of a main pump and an auxiliary pump, and wherein the selective operation of the PTC heater includes, during the active monitoring of the coolant system valve, deactivating the PTC heater.

2. The method of claim 1, wherein the coolant system valve is actuated to a first, open position to circulate coolant through each of the first coolant loop and the second coolant loop, and wherein the coolant system valve is actuated to a second, closed position to inhibit coolant flow from the second coolant loop to the first coolant loop.

3. The method of claim 1, wherein the first coolant loop temperature is a temperature of coolant flowing through the first coolant loop, as estimated based on outputs from a cylinder head temperature sensor and/or a cylinder cooling sleeve temperature sensor, and the second coolant loop temperature is a temperature of coolant flowing through the second coolant loop, as estimated based on outputs of a coolant temperature sensor housed in the second coolant loop.

4. The method of claim 3, wherein the first coolant loop includes an engine, the main pump, a degas bottle, a radiator, and an EGR cooler, and wherein the second coolant loop includes the PTC heater, a heater core, the auxiliary pump, and the coolant temperature sensor.

5. The method of claim 4, wherein indicating degradation includes indicating the coolant system valve as degraded in response to the first difference being higher than a first threshold during the active monitoring of the coolant system valve.

6. The method of claim 5, wherein the active monitoring of the coolant system valve is carried out once during a drive cycle upon confirmation that the coolant temperature sensor housed in the second coolant loop is not degraded.

7. The method of claim 6, further comprising, after completion of the active monitoring of the coolant system valve, throughout the drive cycle, comparing the first difference between the first coolant loop temperature and the second coolant loop temperature to a second threshold, and indicating degradation of the coolant system valve in response to the first difference being higher than the second threshold.

8. The method of claim 6, further comprising, throughout the drive cycle, monitoring a status of the coolant temperature sensor housed in the second coolant loop by comparing an output of the coolant temperature sensor to an anticipated coolant temperature, and detecting degradation of the coolant temperature sensor in response to the output of the coolant temperature sensor being out of a range of the anticipated coolant temperature, the anticipated coolant temperature modelled based on engine speed, engine load, a first position or a second position of the coolant system valve, and the first coolant loop temperature.

9. The method of claim 7, further comprising, after a longer than threshold period of engine inactivity, comparing the first difference between the first coolant loop temperature and the second coolant loop temperature to a third threshold, comparing a second difference between the second coolant loop temperature and an ambient temperature to the third threshold, and indicating degradation of the coolant temperature sensor housed in the second coolant loop in response to one or both of the first difference and the second difference being higher than the third threshold.

10. The method of claim 4, wherein degradation of the coolant system valve includes the coolant system valve being stuck in a closed position inhibiting coolant flow from the second coolant loop to the first coolant loop.

11. The method of claim 1, further comprising, in response to degradation of the coolant system valve, reducing EGR flow to engine cylinders and notifying a vehicle operator.

12. A method for an engine, comprising:
during a first condition, estimating a first difference between an engine cooling loop temperature and a cabin heating loop temperature, estimating a second difference between the cabin heating loop temperature and an ambient temperature, and indicating degradation of a temperature sensor coupled to a cabin heating loop in response to one or both of the first difference and the second difference being higher than a first threshold difference; and
during a second condition, activating each of a main pump coupled to an engine cooling loop and an auxiliary pump coupled to the cabin heating loop, deactivating a positive temperature coefficient (PTC) heater coupled to the cabin heating loop, actuating a heater core isolation valve (HCIV) coupled at a junction of the cabin heating loop and the engine cooling loop to an open position, estimating the first difference between the engine cooling loop temperature and the cabin heating loop temperature, and indicating the HCIV stuck in a closed position in response to the first difference being higher than a second threshold difference.

13. The method of claim 12, wherein the first condition includes an engine start after a longer than threshold period of vehicle inactivity and a third difference between the engine cooling loop temperature and the ambient temperature being lower than a third threshold difference, the third threshold difference lower than each of the first threshold difference and the second threshold difference; and wherein the second condition includes a non-degraded condition of the temperature sensor coupled to the cabin heating loop and a higher than threshold time accumulated in an engine stabilization timer.

14. The method of claim 13, wherein the stabilization timer is incremented at a first rate when one or more engine stabilization conditions are met during a drive cycle, and the stabilization timer is decremented at a different, second rate when the one or more engine stabilization conditions are not met during the drive cycle, the stabilization conditions including a higher than threshold speed of the main pump and a higher than threshold ambient temperature.

15. The method of claim 12, wherein the engine cooling loop includes the engine, the main pump, a degas bottle, a radiator, and an EGR cooler, and wherein the cabin heating loop includes the PTC heater, a heater core, the auxiliary pump, and the temperature sensor.

16. The method of claim 12, wherein the closed position of the HCIV includes a solenoid of the HCIV in a de-energized state inhibiting coolant flow from the cabin heating loop to the engine cooling loop, and wherein the open position of the HCIV includes the solenoid of the HCIV in an energized state enabling coolant flow between the cabin heating loop and the engine cooling loop.

17. A system for an engine, comprising:
a controller with computer readable instructions stored on non-transitory memory that, when executed, cause the controller to:
activate a main pump coupled to an engine cooling loop of a coolant system;
activate an auxiliary pump coupled to a cabin heating loop of the coolant system;
deactivate a positive temperature coefficient (PTC) heater coupled to the cabin heating loop;
actuate a heater core isolation valve (HCIV) coupling the engine cooling loop and the cabin heating loop to an open position to allow coolant to flow between the engine cooling loop and the cabin heating loop;
estimate a cabin heating loop coolant temperature as a function of an output of a cylinder head temperature sensor and/or an output of a cylinder cooling sleeve temperature sensor;
estimate an engine cooling loop coolant temperature based on an output of a cooling loop temperature sensor coupled to the engine cooling loop;
estimate a difference between the cabin heating loop coolant temperature and the engine cooling loop coolant temperature; and
indicate the HCIV stuck in a closed position in response to the difference being higher than a threshold difference.

18. The system of claim 17, wherein in the open position of the HCIV, coolant exiting the engine bifurcates with a first portion of coolant flowing through each of an EGR cooler, a three-way junction in the cabin heating loop, the auxiliary pump, the PTC heater, a heater core, the HCIV, an engine oil cooler, and the main pump prior to returning to the engine, and a second portion of coolant flowing through each of a radiator, a degas bottle, and the main pump prior to returning to the engine.

19. The system of claim 18, wherein in the closed position of the HCIV, the coolant circulates through the auxiliary pump, the PTC heater, the heater core, the HCIV, and the three-way junction in the cabin heating loop without returning to the engine.

* * * * *